(12) United States Patent
Brown et al.

(10) Patent No.: US 8,612,785 B2
(45) Date of Patent: Dec. 17, 2013

(54) OPTIMIZING ENERGY CONSUMPTION UTILIZED FOR WORKLOAD PROCESSING IN A NETWORKED COMPUTING ENVIRONMENT

(75) Inventors: Gene L. Brown, Durham, CT (US); Brendan F. Coffey, Rhinebeck, NY (US); Christopher J. Dawson, Arlington, VA (US); Clifford V. Harris, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/106,905

(22) Filed: May 13, 2011

(65) Prior Publication Data

US 2012/0290862 A1     Nov. 15, 2012

(51) Int. Cl.
*G06F 1/32* (2006.01)
*G06F 9/46* (2006.01)

(52) U.S. Cl.
USPC ............... 713/320; 713/300; 718/1; 718/102; 718/104; 718/105

(58) Field of Classification Search
USPC .............. 713/300, 320; 718/1, 100, 102, 104, 718/105
See application file for complete search history.

(56) References Cited

U.S. PATENT DOCUMENTS

| | | | |
|---|---|---|---|
| 7,197,433 B2 | 3/2007 | Patel et al. | |
| 7,447,920 B2 | 11/2008 | Sharma et al. | |
| 7,644,148 B2 * | 1/2010 | Ranganathan et al. | 709/223 |
| 7,721,290 B2 * | 5/2010 | Horikawa | 718/104 |
| 7,818,594 B2 * | 10/2010 | Gorbatov et al. | 713/320 |
| 7,861,102 B1 | 12/2010 | Ranganathan et al. | |
| 8,245,059 B2 * | 8/2012 | Jackson | 713/300 |
| 2006/0112286 A1 * | 5/2006 | Whalley et al. | 713/300 |
| 2007/0250838 A1 | 10/2007 | Belady et al. | |
| 2009/0119233 A1 | 5/2009 | Dunagan et al. | |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Mark Connolly
(74) *Attorney, Agent, or Firm* — William E. Schiesser; Keohane & D'Alessandro, PLLC

(57) ABSTRACT

Embodiments of the present invention provide an approach for optimizing energy consumption utilized for workload processing in a networked computing environment (e.g., a cloud computing environment). Specifically, when a workload is received, an energy profile (e.g., contained in a computerized data structure) associated with the workload is identified. Typically, the energy profile identifies a set of computing resources needed to process the workload (e.g., storage requirements, server requirements, processing requirements, network bandwidth requirements, etc.), energy consumption attributes of the set of computing resources, and a proposed duration of the workload. Based on the information contained in the energy profile (and resource availability) a schedule (e.g., time, location, etc.) for processing the workload will be determined so as to optimize energy consumption associated with the processing of the workload. In a typical embodiment, the schedule will be determined such that a total cost for processing the workload can be minimized and/or to any budgeted amount/costs can be met.

22 Claims, 6 Drawing Sheets

(56) References Cited

U.S. PATENT DOCUMENTS

| | | |
|---|---|---|
| 2009/0254660 A1 | 10/2009 | Hanson et al. |
| 2010/0058350 A1 | 3/2010 | Boss et al. |
| 2011/0022870 A1 | 1/2011 | McGrane et al. |
| 2011/0035078 A1* | 2/2011 | Jackson ................... 700/300 |
| 2011/0131431 A1* | 6/2011 | Akers et al. ............... 713/320 |
| 2011/0320233 A1* | 12/2011 | Arnette et al. ............. 705/7.15 |
| 2012/0047383 A1* | 2/2012 | Laor et al. ................. 713/324 |
| 2012/0180055 A1* | 7/2012 | Brech et al. ............... 718/102 |

OTHER PUBLICATIONS

Mell et al., "The NIST Definition of Cloud Computing", National Institute of Standards and Technology, Information Technology Laboratory, Version 15, Oct. 7, 2009, 2 pages.

* cited by examiner

OPTIMIZING ENERGY CONSUMPTION UTILIZED FOR WORKLOAD PROCESSING IN A NETWORKED COMPUTING ENVIRONMENT

TECHNICAL FIELD

In general, the present invention relates to energy optimization. Specifically, the present invention relates to optimization of energy consumption utilized for processing a workload in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Challenges exist in that many existing systems do not take into account energy efficiency/economy in the scheduling of workloads/jobs. Given the rising costs of energy, such a drawback can have a serious impact on a business's budget and/or cause energy shortages.

SUMMARY

In general, embodiments of the present invention provide an approach for optimizing energy consumption utilized for workload processing in a networked computing environment (e.g., a cloud computing environment). Specifically, when a workload is received, an energy profile (e.g., contained in a computerized data structure) associated with the workload is identified. Typically, the energy profile identifies a set of computing resources needed to process the workload (e.g., storage requirements, server requirements, processing requirements, network bandwidth requirements, etc.), energy consumption attributes of the set of computing resources, and a proposed duration of the workload. Based on the information in the energy profile (as well as resource availability), a schedule (e.g., time, location, etc.) for processing the workload will be determined so as to optimize energy consumption associated with the processing of the workload. In a typical embodiment, the schedule will be determined such that a total cost for processing the workload can be minimized and/or any budgeted amount/costs can be met.

A first aspect of the present invention provides a computer-implemented method for optimizing energy consumption utilized for workload processing in a networked computing environment, comprising: identifying an energy profile associated with a workload in the networked computing environment, the energy profile being contained in a computerized data structure and the energy profile identifying a set of computing resources needed to process the workload, energy consumption attributes of the set of computing resources, and a proposed duration of the workload; and determining a schedule for processing the workload based on the energy profile, the schedule being determined so as to optimize energy consumption associated with the processing of the workload.

A second aspect of the present invention provides a system for optimizing energy consumption utilized for workload processing in a networked computing environment, comprising: a bus; a processor coupled to the bus; and a memory medium coupled to the bus, the memory medium comprising instructions to: identify an energy profile associated with a workload in the networked computing environment, the energy profile being contained in a computerized data structure and the energy profile identifying a set of computing resources needed to process the workload, energy consumption attributes of the set of computing resources, and a proposed duration of the workload; and determine a schedule for processing the workload based on the energy profile, the schedule being determined so as to optimize energy consumption associated with the processing of the workload.

A third aspect of the present invention provides a computer program product for optimizing energy consumption utilized for workload processing in a networked computing environment, the computer program product comprising a computer readable storage media, and program instructions stored on the computer readable storage media, to: identify an energy profile associated with a workload in the networked computing environment, the energy profile being contained in a computerized data structure and the energy profile identifying a set of computing resources needed to process the workload, energy consumption attributes of the set of computing resources, and a proposed duration of the workload; and determine a schedule for processing the workload based on the energy profile, the schedule being determined so as to optimize energy consumption associated with the processing of the workload.

A fourth aspect of the present invention provides a method for deploying a system for optimizing energy consumption utilized for workload processing in a networked computing environment, comprising: providing a computer infrastructure being operable to: identify an energy profile associated with a workload in the networked computing environment, the energy profile being contained in a computerized data structure and the energy profile identifying a set of computing resources needed to process the workload, energy consumption attributes of the set of computing resources, and a proposed duration of the workload; and determine a schedule for processing the workload based on the energy profile, the schedule being determined so as to optimize energy consumption associated with the processing of the workload.

BRIEF DESCRIPTION OF THE DRAWINGS

These and other features of this invention will be more readily understood from the following detailed description of the various aspects of the invention taken in conjunction with the accompanying drawings in which.

Figure 1:
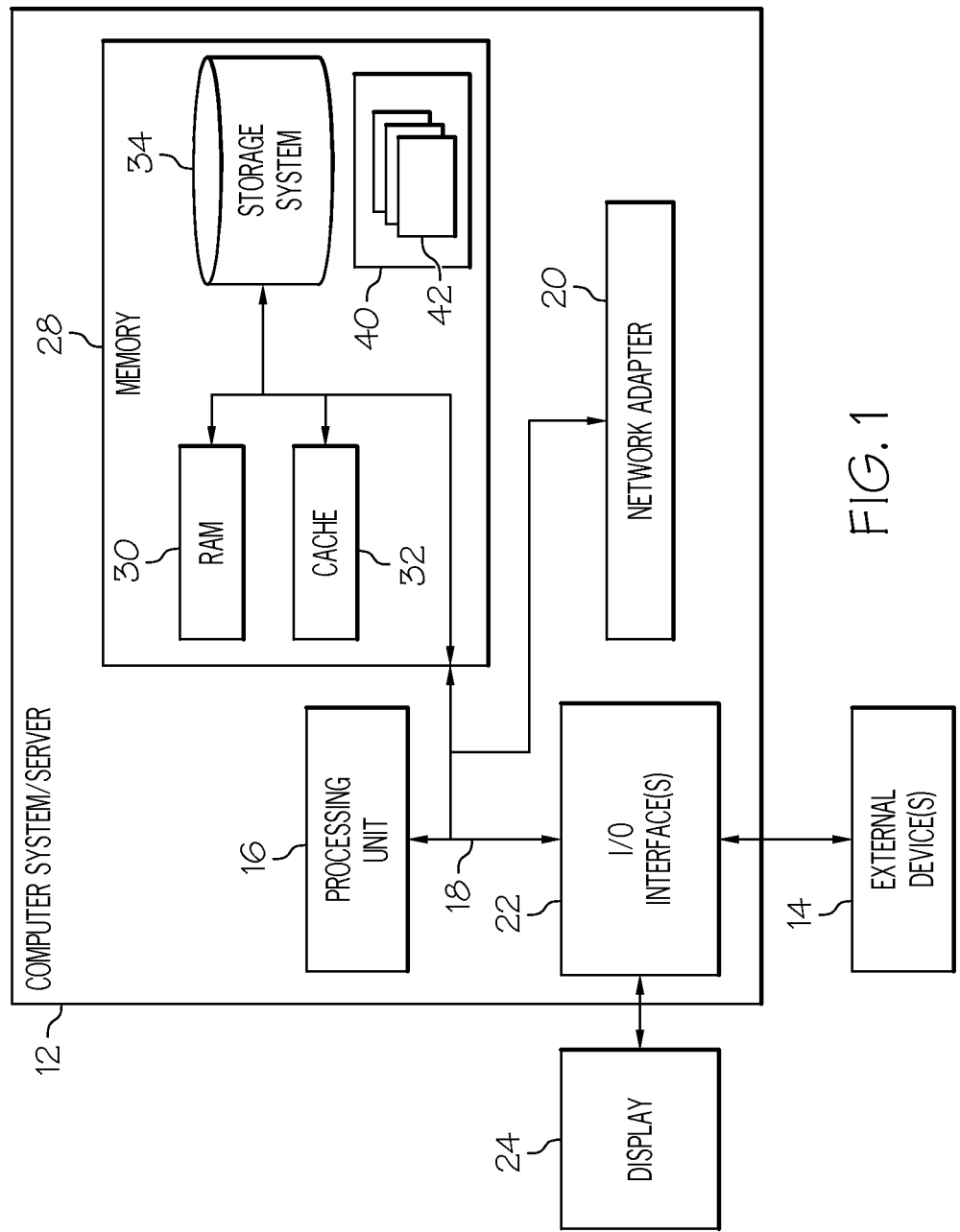
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above embodiments of the present invention provide an approach for optimizing energy consumption utilized for workload processing in a networked computing environment (e.g., a cloud computing environment). Specifically, when a workload is received, an energy profile (e.g., contained in a computerized data structure) associated with the workload is identified. Typically, the energy profile identifies a set of computing resources needed to process the workload (e.g., storage requirements, server requirements, processing requirements, network bandwidth requirements, etc.), energy consumption attributes of the set of computing resources, and a proposed duration of the workload. Based on the information contained in the energy profile (and resource availability) a schedule (e.g., time, location, etc.) for processing the workload will be determined so as to optimize energy consumption associated with the processing of the workload. In a typical embodiment, the schedule will be determined such that a total cost for processing the workload can be minimized and/or to any budgeted amount/costs can be met.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
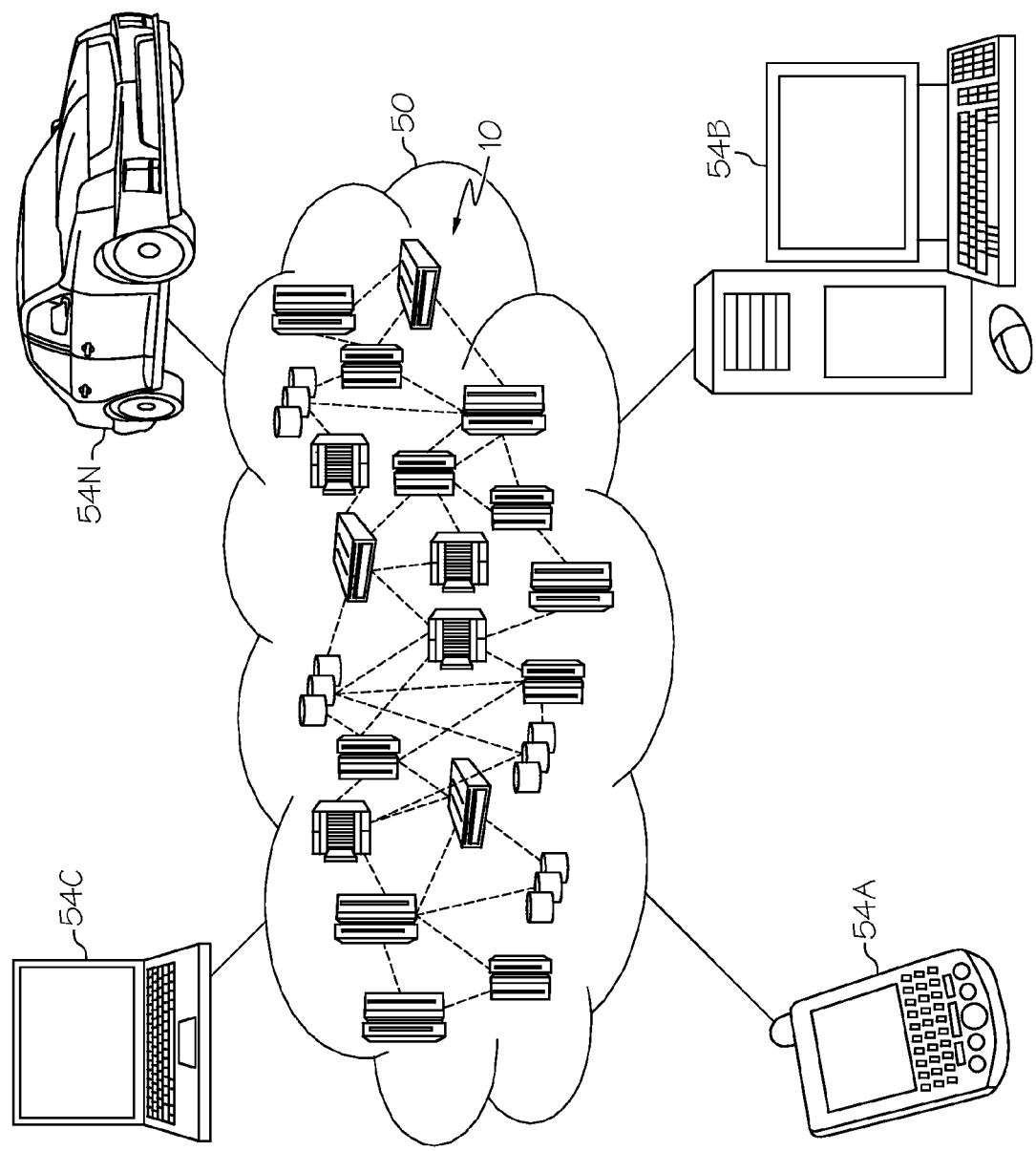
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
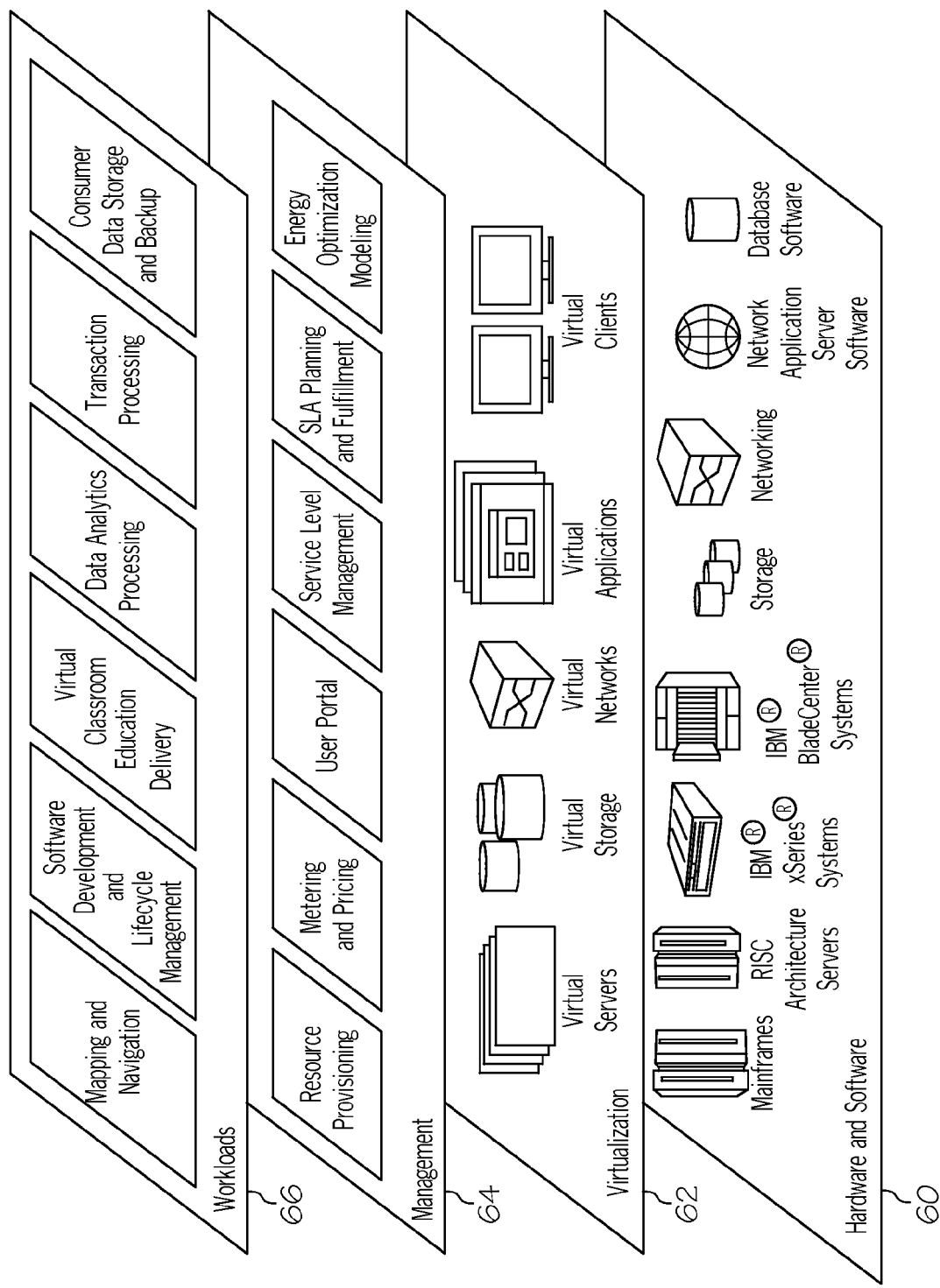
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is energy optimization modeling, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the energy optimization modeling functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

All information technology (IT) computing resources have an energy consumption factor that likely may not be obvious to a typical organization. Since computing workloads typically require use of multiple computing resources, a workload's energy consumption factor needs to associate all of these variables together to develop a base cost model for energy consumption for a given workload. Where available, these scenarios can be associated with an enterprise's workload policies (e.g., a given policy might suggest that a particular workload has no time or location dependencies for execution). Such scenarios might recommend execution of a given workload at an optimal time of the day/week and or a particular location to capture better energy prices and thus reduce the workload's cost. Moreover, these scenarios might suggest executing workloads on a specific pool of IT resources thus allowing other IT resources to be powered off for a particular period of time. Still yet, the scenarios might even suggest executing workloads on a pool of resources in an alternate computing facility (e.g., different data center within the enterprise) or in an alternate geography (e.g., moving workloads from jurisdiction "A" to jurisdiction "B" to capture better energy pricing), thus allowing a particular site to power off high-energy use components such as power, cooling, and compute farms.

Embodiments of the present invention support dynamic identification of energy cost attributes for execution of units of work across the catalogued IT components/resources for a defined period of time. As will be further described in conjunction with FIG. 4, an energy optimization modeler (EOM) is provided hereunder that leverages a repository for configuring specific workloads based on the types of components it requires for execution, the expected duration required to execute this workload, and the desired schedule, shift, and computing site. The EOM defines the various types of configuration components it supports and is extensible to include new components as they become available. The EOM can also define the energy attribute(s) for each component/resource using manufacturer-provided specifications. The components include required infrastructure (e.g., cooling, power, etc.) and the EOM computes an associated allocation percentage based upon the selected components in order to derive the energy attribute. The EOM may be initially populated with the energy cost schedules from the participating energy providers and is capable of being updated dynamically as energy prices fluxuate. The energy cost schedules in raw form should convey the significant differences that can occur depending on time of day, day of week, and location that energy is procured for. With the energy attributes computed for the workload, a model can be defined by the EOM to indicate the cost to execute this workload using the following formula:

$$\text{Total Workload Energy Cost} = \text{Workload(Total Energy Attribute per kWh)} \times \text{Workload Duration (Mins)} \times \text{Energy Cost Metric}$$

Though not shown in the example, the EOM can support iterative modeling such that multiple optimization scenarios can be provided. It can be noted that the EOM is extensible to support any number of defined workloads and configuration components. As product improvements occur and energy efficiencies are provided within new configuration components, the EOM can be easily modified to recognize these changes to the energy attribute factor. Moreover, the EOM can recognize that multi-workload execution decisions can reflect different prices for energy based on the physical location of the computing site. The EOM can also support tactical business decision-making where a particular business needs to identify and redirect workload computing away from a computing site that is reaching limits on its power usage (e.g., government or energy provider regulations).

As such, embodiments of the present invention allow for the building of a complete composite energy profile for business processes (e.g., workload). These energy profiles serve to represent all IT and environmental components that are utilized in the execution of that business process. Among other things, embodiments of the present invention provide Energy profiles for composite business processes (e.g., workload specific energy usage, time of day-based consumption, location-based consumption).
    A modeling component that provides least-cost "energy-routing" options.
    A modeling component that integrates real-time energy pricing into the decision-making.
    An extensible model to recognize changes to IT component and infrastructure efficiency improvements.
    Interoperability with existing workload scheduling.

Figure 4:
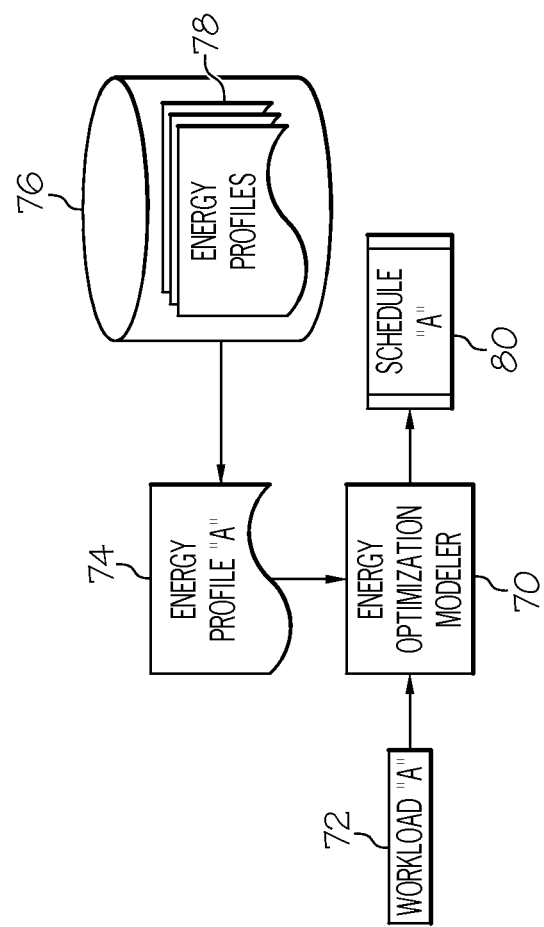
FIG. 4 depicts a system diagram according to an embodiment of the present invention.

Referring now to FIG. 4, a system diagram according to embodiments of the present invention is shown. As depicted, the system comprises an energy optimization modeler (EOM) 70) that is generally represented by program/utility 40 of FIG. 1 and energy optimization modeler function of FIG. 3. In general, EOM 70 comprises a rules engine or the like that is programmed with logic to enable/implement/perform all function of the embodiments of the present invention discussed herein. As depicted, EOM 70 generally receives a workload 72 and identifies an energy profile 74 associated with the workload. As shown, energy profile 74 can be obtained from a repository 76 of energy profiles 78. In a typical embodiment, the energy profile 74 identifies a set of computing resources needed to process workload 72, energy consumption attributes of the set of computing resources, and a proposed duration of the workload. Along these lines, EOM 70 can generate energy profiles 78 using information provided and/or obtained from individuals, and/or third-party sources (e.g., manufacturers). Moreover, each workload can have its own energy profile, multiple workloads could pertain to a single energy, etc. Regardless, based on energy profile 74 (and the availability of any needed computing resources), EOM 70 will determine a schedule 80 (at least one time for processing the workload, and at least one location for processing the workload) for processing the workload so as to optimize energy consumption associated with the processing of the workload. For example, EOM 70 determines to minimize a total cost for processing the workload based on the proposed duration and the energy consumption attributes of the set of computing resources. Moreover, the energy consumption attributes can comprise an estimated energy level of the set of resources to process the workload, and a cost schedule associated with the estimated energy level. In any event, in determining schedule 80, EOM 70 will compute a total cost of processing workload 72, compare the total cost to a budgeted cost, adjusting schedule 80 if the total cost varies from the budget cost by a predetermined threshold.

In summary, EOM 70 can perform one or more of the following steps:
Each of the steps is shown in detail below:
    Step 1. Define and populate workloads to be modeled through EOM. The EOM has access to a workload's profile which can includes a name, required configuration components, expected duration (e.g., execution time), and desired schedule (hr/day/month/location).
    The name of the workload.
    The required configuration components for the workload.
    Expected execution duration (e.g., run-time) for the workload.
    Desired schedule (hr/day/month/location) for the workload.
    Workload's priority.
This information could be stored in the EOM which may be comprised of a relational database or other format such as extensible markup language (XML). The capacity of the data store is limited to how many workloads can be effectively modeled using EOM.
    Step 2a. Populate EOM configuration component's energy attributes. Configuration components are the individual physical computing resources that have associated energy relationships (e.g., software does not). As new components (e.g., a new server), or new models or versions for existing components, are planned to be deployed within a given infrastructure, then their associated energy attribute will be loaded into the EOM. This can be a manual activity or tied into existing configuration management database tools that also track these components. There are also infrastructure components that comprise the underlying infrastructure (e.g., power distribution units, chillers, universal power supplies, air conditioning, etc.) that also have associated energy attributes that will need to be loaded into the EOM. This serves to create the data model for all existing configuration components and their respective energy attributes.
    Step 2b. Populate EOM energy cost profiles.
Cost of energy will vary based upon supplies, time of demand, size of demand, and duration of demand. The EOM will need to be populated initially with this data as provided by the energy suppliers and then updated on a frequency thereafter.
    Step 3. Analyze desired workload using EOM.
As requested, EOM will analyze for a given workload the most cost-effective schedule for execution of said workload. EOM will first utilize the formula, Total Workload Energy Cost=Workload (Mins)×Energy Cost Metric, to derive the baseline for the workload's default execution. It will then iterate through all available schedules to derive the set of cost-optimized solutions in which to execute the workload.

The iterative modeling will have a scope that spans hours/ weeks/months and available computing sites and can be user-defined within the EOM. The EOM will also recognize a workload's priority and can thus consider scheduled time for lower-priority work as being available for rescheduling on behalf of higher-priority workloads.

Step 4. Generate optimal schedule alternatives.

The results of the EOM analysis could be a prioritized list of the most effective schedules based upon expected cost of execution savings. The EOM can be directed to re-run the workload's analysis based upon events (e.g., 10% change in energy costs) or as a normal iteration (e.g., every week). Each user can specify for a given workload the business rules for EOM analysis. These rules will specify the frequency of analysis (e.g., daily, weekly quarterly, etc), the event classifications (e.g., energy suppliers, infrastructure changes, etc), the event triggers (e.g., energy price+/-10%, new servers in location A, etc), minimum/maximum financial boundaries, and prioritization schema.

Step 5. Commit a workload schedule.

EOM can be used to commit a given workload's chosen execution schedule. EOM will be updated to mark that schedule as allocated and can provide out-bound feeds to installation specific job schedulers. A confirmed status commits the schedule and associated resources for the workload as assigned.

Figure 5:
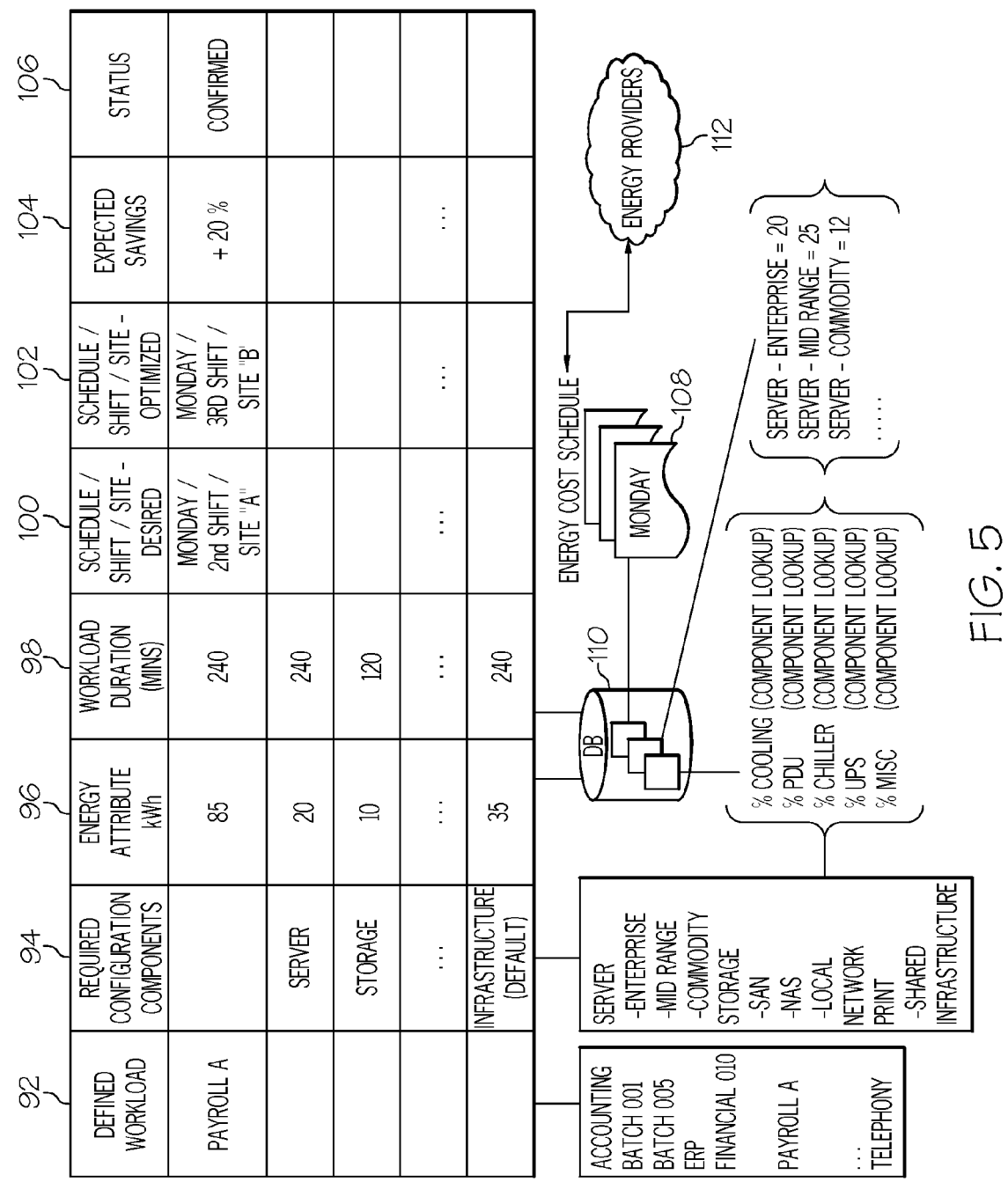
FIG. 5 depicts an illustrative energy profile stored in a data structure according to an embodiment of the present invention.

Referring now FIG. 5, an illustrative energy profile 90 according to an embodiment of the present invention is shown. As depicted, profile 90 can identify a workload 92, required/needed components 94 for processing the workload, energy consumption attributes 96 (e.g., an energy level), a duration of the workload 98, a desired schedule for processing the workload 100, an optimized schedule 102 for processing the workload (e.g., as determined by EOM 70 of FIG. 4), expected savings 104 (by processing the workload according to the optimized schedule), and a status 106 (e.g., whether the workload was processed, authorized to be processed, etc.). As further shown, the energy profile can draw upon multiple information sources such as energy cost schedule 108 provided by energy providers 112, and stored in a database 110 or the like.

Figure 6:
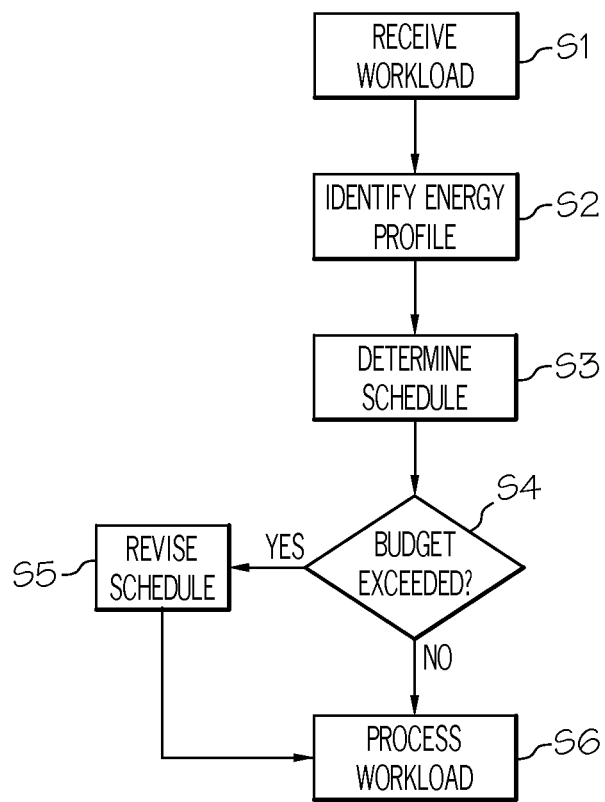
FIG. 6 depicts a method flow diagram according to an embodiment of the present invention.

Referring now to FIG. 6, a method flow diagram according to an embodiment of the present invention is shown. As depicted, in step S1, a workload is received. In step S2, an energy profile associated with the workload is identified. As indicated above, the energy profile will typically be contained in a computerized data structure and will identify a set of computing resources needed to process the workload, energy consumption attributes of the set of computing resources, and a proposed duration of the workload. In step S3, a schedule for processing the workload will be determined based on the energy profile so as to optimize energy consumption associated with the processing of the workload. In step S4, it will be determined whether a total cost for the workload exceeds a budgeted cost by a predetermined threshold. If so, the schedule can be revised/adjusted in step S5 to reduce the total cost for processing the workload before the workload is processed in step S6.

While shown and described herein as an energy optimization solution, it is understood that the invention further provides various alternative embodiments. For example, in one embodiment, the invention provides a computer-readable/useable medium that includes computer program code to enable a computer infrastructure to provide energy optimization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide energy optimization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/ or the service provider can receive payment from the sale of advertising content to one or more third parties.

In still another embodiment, the invention provides a computer-implemented method for energy optimization. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/ driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

We claim:

1. A computer-implemented method for optimizing energy consumption utilized for workload processing in a networked computing environment, comprising:
   identifying an energy profile associated with a workload in the networked computing environment, the energy profile being contained in a computerized data structure and the energy profile identifying a set of computing resources needed to process the workload, energy consumption attributes of the set of computing resources, and a proposed duration of the workload, and a priority of the workload;
   determining a schedule for processing the workload based on the energy profile, the schedule being determined so as to optimize energy consumption and an expected cost associated with the processing of the workload;
   rescheduling, to accommodate the schedule, at least one other workload, if the at least one other workload has a lower priority associated therewith as compared to the priority of the workload; and
   repeating the determining and rescheduling steps in response to a change in the expected cost beyond a predetermined threshold.

2. The computer-implemented method of claim 1, the schedule being determined to minimize a total cost for processing the workload based on the proposed duration and the energy consumption attributes of the set of computing resources.

3. The computer-implemented method of claim 2, the energy consumption attributes comprising an estimated energy level of the set of resources to process the workload, and a cost schedule associated with the estimated energy level.

4. The computer-implemented method of claim 3, the schedule comprising at least one time for processing the workload, and at least one location for processing the workload within the networked computing environment.

5. The computer-implemented method of claim 2, further comprising:
   comparing the total cost to a budgeted cost; and
   adjusting the schedule if the total cost varies from the budget cost by a predetermined threshold.

6. The computer-implemented method of claim 2, the schedule being further based on an availability of the set of computing resources.

7. The computer-implemented method of claim 1, the networked computing environment comprising a cloud computing environment.

8. A system for optimizing energy consumption utilized for workload processing in a networked computing environment, comprising:
   a bus;
   a processor coupled to the bus; and
   a memory medium coupled to the bus, the memory medium comprising instructions to:
   identify an energy profile associated with a workload in the networked computing environment, the energy profile being contained in a computerized data structure and the energy profile identifying a set of computing resources needed to process the workload, energy consumption attributes of the set of computing resources, and a proposed duration of the workload;
   determine a schedule for processing the workload based on the energy profile, the schedule being determined so as to optimize energy consumption and an expected cost associated with the processing of the workload;
   reschedule, to accommodate the schedule, at least one other workload, if the at least one other workload has a lower priority associated therewith as compared to the priority of the workload and
   repeat the determining and rescheduling steps in response to a change in the expected cost beyond a predetermined threshold.

9. The system of claim 8, the schedule being determined to minimize a total cost for processing the workload based on the proposed duration and the energy consumption attributes of the set of computing resources.

10. The system of claim 9, the energy consumption attributes comprising an estimated energy level of the set of resources to process the workload, and a cost schedule associated with the estimated energy level.

11. The system of claim 10, the schedule comprising at least one time for processing the workload, and at least one location for processing the workload within the networked computing environment.

12. The system of claim 9, the memory medium further comprising instructions to:
    compare the total cost to a budgeted cost; and
    adjust the schedule if the total cost varies from the budget cost by a predetermined threshold.

13. The system of claim 9, the schedule being further based on an availability of the set of computing resources.

14. The system of claim 8, the networked computing environment comprising a cloud computing environment.

15. A computer program product for optimizing energy consumption utilized for workload processing in a networked computing environment, the computer program product comprising a computer readable storage media, and program instructions stored on the computer readable storage media, to:
    identify an energy profile associated with a workload in the networked computing environment, the energy profile being contained in a computerized data structure and the energy profile identifying a set of computing resources needed to process the workload, energy consumption attributes of the set of computing resources, and a proposed duration of the workload;
    determine a schedule for processing the workload based on the energy profile, the schedule being determined so as to optimize energy consumption and an expected cost associated with the processing of the workload;
    reschedule, to accommodate the schedule, at least one other workload, if the at least one other workload has a lower priority associated therewith as compared to the priority of the workload; and
    repeat the determining and rescheduling steps in response to a change in the expected cost beyond a predetermined threshold.

16. The computer program product of claim 15, the schedule being determined to minimize a total cost for processing the workload based on the proposed duration and the energy consumption attributes of the set of computing resources.

17. The computer program product of claim 16, the energy consumption attributes comprising an estimated energy level of the set of resources to process the workload, and a cost schedule associated with the estimated energy level.

18. The computer program product of claim 17, the schedule comprising at least one time for processing the workload, and at least one location for processing the workload within the networked computing environment.

19. The computer program product of claim 16, the computer program product further comprising program instructions to:
   compare the total cost to a budgeted cost; and
   adjust the schedule if the total cost varies from the budget cost by a predetermined threshold.

20. The computer program product of claim 16, the schedule being further based on an availability of the set of computing resources.

21. The computer program product of claim 15, the networked computing environment comprising a cloud computing environment.

22. A method for deploying a system for optimizing energy consumption utilized for workload processing in a networked computing environment, comprising:

providing a computer infrastructure being operable to:
   identify an energy profile associated with a workload in the networked computing environment, the energy profile being contained in a computerized data structure and the energy profile identifying a set of computing resources needed to process the workload, energy consumption attributes of the set of computing resources, and a proposed duration of the workload;
   determine a schedule for processing the workload based on the energy profile, the schedule being determined so as to optimize energy consumption and an expected cost associated with the processing of the workload;
   reschedule, to accommodate the schedule, at least one other workload, if the at least one other workload has a lower priority associated therewith as compared to the priority of the workload; and
   repeat the determining and rescheduling steps in response to a change in energy costs beyond a predetermined threshold.

* * * * *